(12) United States Patent
Dhawan et al.

(10) Patent No.: US 9,313,307 B2
(45) Date of Patent: Apr. 12, 2016

(54) SYSTEM AND METHOD FOR VERIFYING THE IDENTITY OF A USER BY VOICEPRINT ANALYSIS

(75) Inventors: Vishal Dhawan, Centreville, VA (US); Timothy M. Price, Rockville, MD (US); Manoj Sindhwani, Oak Hill, VA (US)

(73) Assignee: XTONE NETWORKS, INC., Reston, VA (US)

( * ) Notice: Subject to any disclaimer, the term of this patent is extended or adjusted under 35 U.S.C. 154(b) by 214 days.

(21) Appl. No.: 12/717,854

(22) Filed: Mar. 4, 2010

(65) Prior Publication Data

US 2010/0158207 A1 Jun. 24, 2010

Related U.S. Application Data

(63) Continuation-in-part of application No. 11/514,116, filed on Sep. 1, 2006, now abandoned.

(60) Provisional application No. 61/157,296, filed on Mar. 4, 2009, provisional application No. 60/712,808, filed on Sep. 1, 2005.

(51) Int. Cl.
*H04M 1/253* (2006.01)
*H04M 1/247* (2006.01)
*G10L 17/22* (2013.01)
*H04M 3/493* (2006.01)

(52) U.S. Cl.
CPC ............ *H04M 1/2478* (2013.01); *G10L 17/22* (2013.01); *H04M 3/4936* (2013.01); *H04M 1/2535* (2013.01); *H04M 2201/41* (2013.01); *H04M 2250/74* (2013.01)

(58) Field of Classification Search
USPC ............ 379/88.14, 88.21; 704/258, 270–275, 704/246
See application file for complete search history.

(56) References Cited

U.S. PATENT DOCUMENTS

| | | | |
|---|---|---|---|
| 5,073,923 A | 12/1991 | Offers et al. |
| 5,323,444 A | 6/1994 | Ertz et al. |
| 6,334,103 B1 | 12/2001 | Surace et al. |
| 6,408,272 B1 | 6/2002 | White et al. |
| 6,636,831 B1 | 10/2003 | Profit, Jr. et al. |
| 6,738,743 B2 | 5/2004 | Sharma et al. |
| 6,757,781 B2 | 6/2004 | Williams et al. |
| 6,829,334 B1 | 12/2004 | Zirngibl et al. |
| 6,882,974 B2 | 4/2005 | James et al. |
| 6,901,431 B1 | 5/2005 | Dodrill et al. |
| 6,977,992 B2 | 12/2005 | Zirngibl et al. |
| 6,988,070 B2 | 1/2006 | Kawasaki et al. |
| 7,016,847 B1 | 3/2006 | Tessel et al. |
| 7,020,609 B2 | 3/2006 | Thrift et al. |

(Continued)

FOREIGN PATENT DOCUMENTS

WO 96/20448 7/1996

OTHER PUBLICATIONS

U.S. Appl. No. 12/717,893, filed Mar. 4, 2010.

(Continued)

*Primary Examiner* — Amal Zenati
(74) *Attorney, Agent, or Firm* — Nixon & Vanderhye P.C.

(57) ABSTRACT

A distributed voice application execution environment system conducts a voiceprint analysis when a user initially begins to interact with the system. If the system is able to identify the user through a voiceprint analysis, the system immediately begins to interact with the user utilizing voice applications which have been customized for that user.

21 Claims, 6 Drawing Sheets

(56) References Cited

U.S. PATENT DOCUMENTS

| | | | |
|---|---|---|---|
| 7,062,709 B2 | 6/2006 | Cheung | |
| 8,140,340 B2 * | 3/2012 | Bhogal | G10L 17/00 704/273 |
| 2002/0001370 A1 | 1/2002 | Walker et al. | |
| 2002/0059073 A1 | 5/2002 | Zondervan et al. | |
| 2002/0169604 A1 | 11/2002 | Damiba et al. | |
| 2002/0188451 A1 | 12/2002 | Guerra et al. | |
| 2003/0007609 A1 | 1/2003 | Yuen et al. | |
| 2003/0068999 A1 | 4/2003 | Casali et al. | |
| 2003/0125944 A1 * | 7/2003 | Wohlsen | G10L 17/24 704/246 |
| 2003/0144005 A1 | 7/2003 | Videtich | |
| 2003/0233238 A1 | 12/2003 | Creamer et al. | |
| 2004/0006471 A1 | 1/2004 | Chiu | |
| 2004/0010412 A1 | 1/2004 | Chiu | |
| 2004/0068364 A1 | 4/2004 | Zhao et al. | |
| 2004/0151285 A1 | 8/2004 | Sychta | |
| 2004/0163073 A1 | 8/2004 | Krzyzanowski et al. | |
| 2004/0210637 A1 * | 10/2004 | Loveland | 709/204 |
| 2004/0230689 A1 | 11/2004 | Loveland | |
| 2005/0091057 A1 | 4/2005 | Phillips et al. | |
| 2005/0135338 A1 | 6/2005 | Chiu et al. | |
| 2005/0141679 A1 | 6/2005 | Zirngibl et al. | |
| 2005/0163136 A1 | 7/2005 | Chiu et al. | |
| 2005/0234720 A1 | 10/2005 | Paillet et al. | |
| 2005/0283367 A1 | 12/2005 | Ativanichayaphong et al. | |
| 2006/0047511 A1 | 3/2006 | Hussain | |
| 2006/0069701 A1 | 3/2006 | O'Rourke, III | |
| 2006/0122840 A1 | 6/2006 | Anderson et al. | |
| 2006/0293897 A1 | 12/2006 | White et al. | |
| 2007/0143113 A1 | 6/2007 | Nanavati et al. | |

OTHER PUBLICATIONS

U.S. Appl. No. 12/717,888, filed Mar. 4, 2010.
U.S. Appl. No. 12/717,875, filed Mar. 4, 2010.
U.S. Appl. No. 12/717,858, filed Mar. 4, 2010.
U.S. Appl. No. 12/717,839, filed Mar. 4, 2010.
U.S. Appl. No. 12/717,826, filed Mar. 4, 2010.
U.S. Appl. No. 12/717,897, filed Mar. 4, 2010.
U.S. Appl. No. 12/717,865, filed Mar. 4, 2010.
U.S. Appl. No. 12/717,881, filed Mar. 4, 2010.
U.S. Appl. No. 11/514,116, filed Sep. 1, 2006.
Office Action issued on Feb. 26, 2010 in U.S. Appl. No. 11/514,116.

* cited by examiner

SYSTEM AND METHOD FOR VERIFYING THE IDENTITY OF A USER BY VOICEPRINT ANALYSIS

This application claims priority to the filing date of U.S. Provisional Application No. 61/157,296, which was filed on Mar. 4, 2009, the contents of which are hereby incorporated by reference. This application is also a continuation-in-part of U.S. application Ser. No. 11/514,116, which was filed on Sep. 1, 2006 now abandoned, which itself claims priority to the filing date of U.S. Provisional Application No. 60/712,808, which was filed on Sep. 1, 2005, the contents of both of which are hereby incorporated by reference.

FIELD OF THE INVENTION

The invention relates to systems and methods for identifying a user or for verifying the identity of a user who is interacting with a system using voice commands.

BACKGROUND OF THE INVENTION

There are various existing computer and telephony systems that provide voice services to users. These voice services can be speech recognition and touchtone enabled. Examples of such services include voice mail, voice activated dialing, customer care services, and the provision of access to Internet content via telephone. A diagram of the system architecture used to deliver such services is provided in FIG. 1.

One common example of a system that provides voice services is an Interactive Voice Response (IVR) system. In prior art systems, a user would typically use a telephone 1010 to call in to a central computer system 1060 through a typical telephone connection 1040. The central voice services platform 1060 provides voice services via an IVR system. The IVR system deployed on the central computer system would then launch voice services, for instance by playing an audio clip containing a menu of choices to the user via the telephone line connection. The user could then make a selection by speaking a response. The spoken response would be received at the central computer system via the telephone line connection, and the central computer system would interpret the spoken response using speech recognition techniques. Based on the user's response, the IVR system would then continue to perform application logic to take further action. The further action could involve playing another menu of choices to the user over the telephone line, obtaining and playing information to the user, connecting the user to a third party or a live operator, or any of a wide range of other actions.

The ability to provide voice services has been quite limited by the nature of the systems that provide such services. In the known systems that provide voice services using relatively complex speech recognition processing, the voice applications are performed on high end computing devices located at a central location. Voice Application processing requires a high end centralized computer system because these systems are provisioned to support many simultaneous users.

Because complex voice application processing must be provided using a high end computer system at a central location, and because users are almost never co-located with the high end computer system, a user is almost always connected to the central computer system via a telephone call. The call could be made using a typical telephone or cell phone over the PSTN, or the call might be placed via a VoIP-type (Skype, SIP) connection. Regardless, the user must establish a dedicated, persistent voice connection to the central computer system to access the voice services.

The prior art centralized voice services platforms, which depend on a telephony infrastructure for connection to users, are highly inflexible from a deployment standpoint. The configurations of hardware and software are all concentrated on a small number of high end servers. These configurations are technically complex and hard to monitor, manage, and change as business conditions dictate. Furthermore, the deployment of existing IVR system architectures, and the subsequent provisioning of users and voice applications to them, requires extensive configuration management that is often performed manually. Also, changes in the configuration or deployment of IVR services within extant IVR architectures often require a full or partial suspension of service during any reconfiguration or deployment effort.

Further, cost structures and provisioning algorithms that provision the capabilities of such a centralized voice services platform make it virtually impossible to ensure that a caller can always access the system when the system is under heavy usage. If the system were configured with such a large number of telephone line ports that all potential callers would always be connected to access contrasting types of voice services, with different and overlapping peak utilization hours, the cost of maintaining all the hardware and software elements would be prohibitive. Instead, such centralized voice services platforms are configured with a reasonable number of telephone ports that result in a cost-effective operating structure. The operator of the system must accept that callers may sometimes be refused access. Also, system users must accept that they will not receive an "always on" service.

Prior art centralized voice services platforms also tend to be "operator-centric." In other words, multiple different service providers provide call-in voice services platforms, but each service provider usually maintains their own separate platform. If the user has called in to a first company's voice services platform, he would be unable to access the voice services of a second company's platform. In order to access the second company's voice services platform, the user must terminate his call to the first company, and then place a new call to the second company's platform. Thus, obtaining access to multiple different IVR systems offered by different companies is not convenient.

In addition to the above-described drawbacks of the current architecture, the shared nature of the servers in a centralized voice services platform limits the ability of the system to provide personalized voice applications to individual users. Similarly, the architecture of prior art IVR systems limit personalization even for groups of users. Because of these factors, the prior art systems have limitations on their ability to dynamically account for individual user preferences or dynamically personalize actual voice applications on the fly. This is so because it becomes very hard for a centralized system to correlate the user with their access devices and environment, to thereby optimize a voice application that is tuned specifically for an individual user. Further, most centralized systems simply lack user-specific data.

Prior art voice services platforms also had security issues. In many instances, it was difficult to verify the identity of a caller. If the voice services platform was configured to give the user confidential information, or the ability to transfer or spend money, security becomes an important consideration.

Typically, when a call is received at the voice services platform, the only information the voice services platform has about the call is a caller ID number. Unfortunately, the caller ID number can be falsified. Thus, even that small amount of information could not be used as a reliable means of identifying the caller. For these reasons, callers attempting to access sensitive information or services were usually asked to provide identifying data that could be compared to a database of security information. While this helps, it still does not guarantee that the caller is the intended user, since the identifying data could be provided by anybody.

DETAILED DESCRIPTION OF PREFERRED EMBODIMENTS

Figure 1:
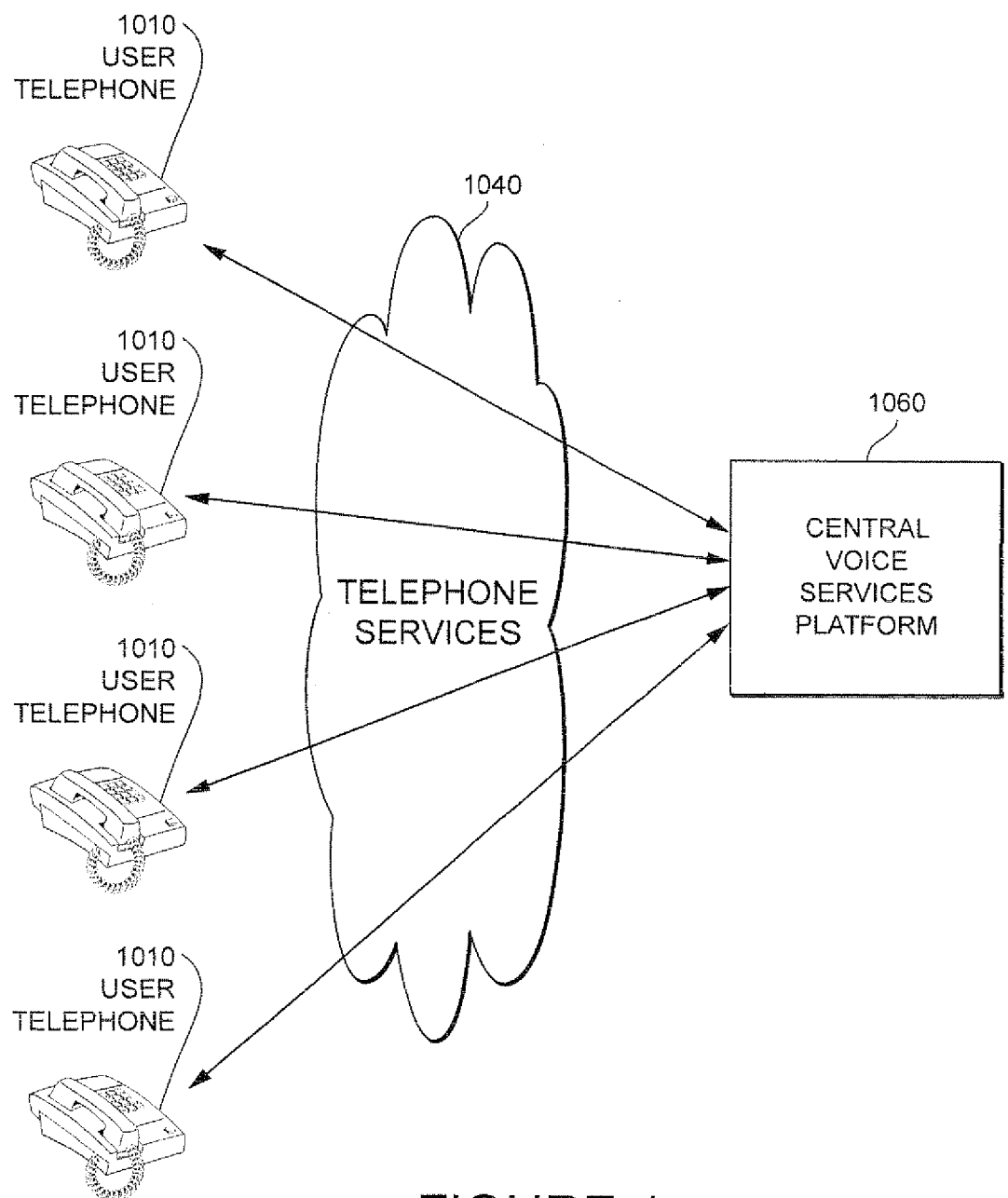
FIG. 1 is a diagram of a background art system used to deliver voice-based services to a user.
Figure 2:
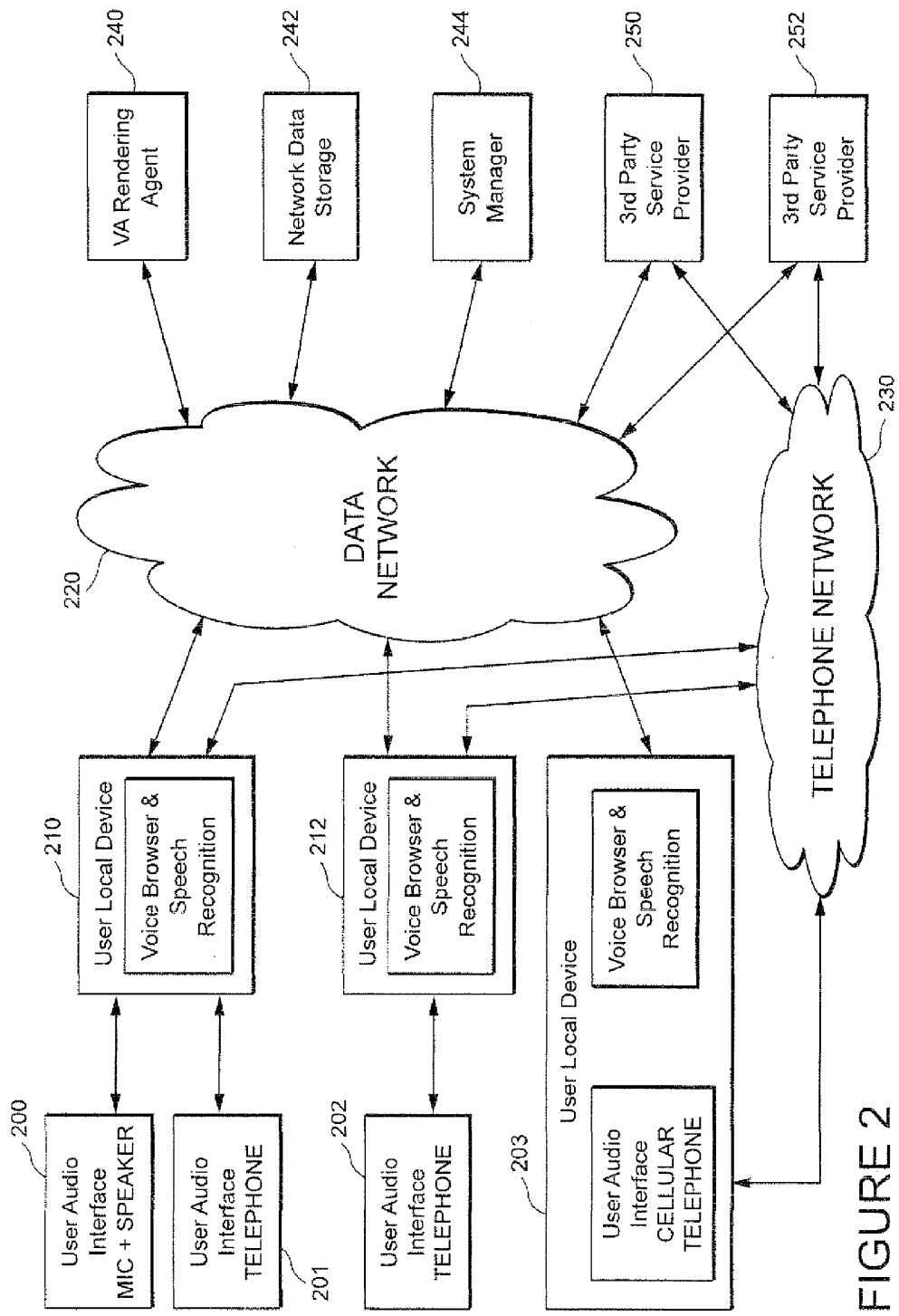
FIG. 2 is a diagram of a system embodying the invention that can be used to deliver voice-based services to a user.

The inventors have developed new systems and methods of delivering voice-based services to users which make use of some aspects of the basic architecture illustrated in FIG. 2. A full description of the systems and methods created by the inventors is provided in U.S. patent application Ser. No. 11/514,116, which was filed on Sep. 1, 2006.

The systems and methods created by the inventors are intended to provide users with speech and touch tone enabled Voice Applications for accessing various services and for performing various functions. In this respect, the systems, devices and methods embodying the invention serve some of the same functions as prior art centralized voice services platforms. The systems and methods can also be used to provide the same type of call forwarding discussed above, but at a lower cost, and with greater flexibility. In addition, the systems and methods created by the inventors make it possible to provide users with a whole host of additional call handling and call notification functions that would have been impossible with prior systems.

Unlike the prior art voice services platforms, systems and methods embodying the invention utilize a highly distributed processing architecture to deliver the services. As will be explained below, the underlying architecture and the distributed nature of systems and methods embodying the invention allow the inventive systems to provide the same services as the prior art systems, but with better performance, at a significantly reduced cost, and with far fewer limitations. In addition, systems and methods embodying the invention avoid or solve many of the drawbacks of the prior systems. Further, because of the way systems and methods embodying the invention operate, they can provide new and additional services that could never have been provided by the prior art systems. Systems and methods embodying the invention also allow for much better personalization of delivered services, and they allow existing services to be upgraded, improved, or further personalized much more easily than was possible with the prior art systems.

Systems and methods embodying the invention are intended to deliver or provide Voice Applications (hereinafter, "VAs") for a user. Before beginning a discussion of systems and methods that embody the invention, we should start by discussing what a VA is, and what a VA can do for a user. Unfortunately, this is somewhat difficult, because VAs can take a wide variety of different forms, and can accomplish a wide variety of different tasks.

A VA provides a user with the ability to use their natural voice, touch tone sequences or other forms of user input, to access and/or control an application, to obtain information, to perform a certain function, or to accomplish other tasks. Although the majority of the following description assumes that a user will interact with a system embodying the invention, at least in part, via speech, other forms of user interaction fall within the scope and spirit of the invention. For instance, developing technologies that allow a user to make selections from visual menus via hand or eye movements could also for the basis of a user interaction protocol. Likewise, developing technologies that are able to sense a user's brainwave patterns could form the basis of a user interaction protocol. Thus, systems and methods embodying the invention are not limited to speech-based user interfaces.

A VA could be specifically developed to utilize the benefits of speech recognition-based input processing. For instance, a VA could be developed to access, play and manipulate voice mail via speech commands. Alternatively, a VA could act as an extension or an enhancement of traditional GUI-like applications to allow the traditional applications to be accessed and/or controlled by speech commands. For instance, a VA could allow the user to call up specific e-mail messages on a display via spoken commands, and the user would then read the e-mail messages on the display.

In some instances, a VA could act like one of the interactive voice response systems that are accessible to users on prior art centralized voice services platforms. A VA could act in exactly the same way as a prior art IVR system to allow a user to obtain information or accomplish various functions using a speech enabled interface. However, because of the advantages of the new architecture, a system embodying the invention can perform voice applications that would have been impossible to perform on prior art centralized voice services platforms. Other VAs could perform a wide variety of other tasks. In most instances, the user would be able to accomplish functions or obtain information by simply speaking voice commands.

With the above general description of a Voice Application (VA) as background, we will now provide an overview of systems and methods embodying the invention. The following overview will make reference to FIG. 2, which depicts a high-level diagram of how a system embodying the invention would be organized.

Systems embodying the invention, as shown in FIG. 2, will be referred to as having a Distributed Voice Application Execution System Architecture (hereinafter, a "DVAESA"). Thus, the term DVAESA refers to a system and method of providing voice application services in a distributed fashion, over a network, to a customer device. Such a system is closely managed by a centralized system to, among other things, ensure optimum performance, availability and usability. In some of the descriptions which follow, there are references to "DVAES-enabled" equipment or local devices/device. This means equipment and/or software which is configured to act as a component of a DVAESA embodying the invention.

As shown in FIG. 2, preferred embodiments of the invention would make use of an optional telephone network 230 and a data network 220. The telephone network 230 could be a traditional PSTN, a VoIP system, a peer-to-peer telephone network, a cellular telephone network, or any other network that allows a user to place and receive telephone calls. The data network 220 could be the Internet, or possibly a private or internal local area network or intranet.

In some instances, users would only be physically coupled to a data network, such as the Internet. In this case, the user's on-site equipment could enable them to place VoIP telephone calls via the data network. Such VoIP telephone calls might make use of the PSTN, or the entire call might be handled over the data network. Regardless, in preferred embodiments, the user would be capable of simultaneously maintaining a telephone connection and sending and receiving data.

A user would utilize an audio interface device to access the DVEASA. In the embodiment shown in FIG. 2, a first user's audio interface 200 comprises a microphone and speaker. A second user audio interface 201 comprises a telephone. The telephone 201 is also connected to the same user local device 210 as the first user audio interface. A third user's audio interface 202 could also comprise a telephone. This telephone 202 could be a regular wired telephone, a wireless telephone or even a cellular telephone. The DVAES-enabled devices may support multiple audio interface devices, and the multiple devices could all be of the same type, or multiple different types of user audio interfaces could all be connected to the same local device.

Each user would also make use of a local DVAES-enabled device that would act to deliver or provide VAs to the user through the user's audio interface. The local DVAES-enabled devices would include a voice browser capable of performing voice applications that have been distributed over the network, some of which may have speech recognition functions. Such voice applications could be pre-delivered to the local DVAES-enabled device, or the voice applications could be fetched in real time. Such voice applications are personalized to the user and optimized for the device. In the embodiment shown in FIG. 2, each of the user local devices 210, 212, 203 are coupled to the respective user audio interfaces, and to the data network.

In some embodiments of the invention, a user audio device and a DVAES-enabled device could be integrated into a single electronic device. For instance, a PDA with cell phone capability could also incorporate all of the hardware and software elements necessary for the device to also act as the DVAES-enabled equipment. Thus, a single user device could function as both the DVAES-enabled equipment that communicates with the network, and as the user audio interface. The user local device 203 shown in FIG. 2 is intended to illustrate this sort of an embodiment.

Also, in FIG. 2, various lines connect each of the individual elements. These lines are only intended to represent a functional connection between the two devices. These lines could represent hard-wired connections, wireless connections, infrared communications, or any other communications medium that allows the devices to interact. In some instances the connections could be continuous, and in others the connection could be intermittent. For instance, an audio interface and a user local device could be located within a user's vehicle. In such a case, the local device within the vehicle might only be connected to the network through a cellular telephone network or through another type of wireless network when such connectivity is required to provide a user with services. In a similar embodiment, the local device in the user's vehicle might only link up to the network when the vehicle is parked at the user's home, or some other location, where a wireless connection can be implemented.

Also, the user audio interface 202 shown in FIG. 2 could be a cell phone that is capable of interacting with the normal cellular telephone network. However, the cellular telephone might also be capable of interacting with the user local device 212 via a wired or wireless connection. Further, the cellular telephone 202 might be configured such that it acts like a regular cellular telephone when the user is away from home (and is not connected to the local device 212). But the cellular telephone might switch to a different operating mode when it is connected to the local device 212 (when the user is at home), such that all incoming calls to that cell phone are initially received and processed by the local device 212. The DVAESA also would include some network-based elements. As shown in FIG. 2, the network-based elements could include a VA rendering agent 240, a network storage device 242 and a system manager 244. Each of these network-based elements would be connected to the data network.

Also, although they would not technically be considered a part of the DVAESA, there might also be some third party service providers 250, 252 which are also connected to the data network, and/or to the telephone network. As explained below, the VAs may enable the users to interact with such third party service providers via the data and telephone networks.

When a DVAESA as shown in FIG. 2 is configured, VAs would be "rendered" by the VA rendering agent 240, the output of the rendering process would be rendered VAs. These rendered VAs may be stored on the Network Storage Device 242, or be distributed or delivered to a DVAES-enabled Device. "Rendering" refers to a process in which a generic VA is personalized for a particular user and/or one or more particular DVAES-Devices to generate Rendered VAs. The system manager 244 could instruct the VA rendering agent 240 to render a VA for a particular user, or such rendering request could originate from the DVAES-enabled Device. The DVAESA network data storage element 242 could be used to store generic VA, rendered VAs, or a wide variety of other data and resources (e.g. audio files, grammars etc).

As mentioned above, the VA rendering agent would personalize a generic VA during the rendering process. This could take into account personal traits of the individual user, information about the configuration of the local device(s), or a wide variety of other things, as will be explained in more detail below. The information used to personalize a VA during the rendering process could be provided to the VA rendering agent at the time it is instructed to render the VA, or the VA rendering agent could access the information from various data storage locations available via the data network.

The user's local devices would typically be inexpensive computing devices that are capable of running a voice browser and performing speech recognition capable rendered VAs. Such devices are often referred to as embedded multimedia terminal adaptors (EMTAs) and optical embedded multimedia terminal adaptors (OEMTAs). In many instances, the local device would be physically present at the user's location, such as a home or office. In other instances, however, the local device could be a virtual device that is capable of interacting with one or more user audio interfaces. As mentioned above, the local devices may also store rendered VAs, and then act to perform the rendered VAs to the user's audio interface. The user local device could be a customer premise device that is also used for some other function. For instance, the local device could be a cable modem or set-top box that is also used to connect a television to a cable network, however, the device would also be configured to perform VAs for the user via the user's audio interface.

In one simple embodiment of the invention, a local embedded device 212 would be linked to a user's telephone 202. The local device 212 would also be linked to the Internet 220 via a medium to high speed connection, and possibly to the telephone network 230. The user could speak commands into the telephone 202, and those spoken commands would be processed by the local device 212 to determine what the user is requesting.

The processing and interpretation of a user's spoken commands could be entirely accomplished on the local device 212. In other embodiments, the local device might need to consult a speech recognition engine on a remote device, via the data network, to properly interpret a portion of a spoken command that cannot be understood or interpreted by the local device. In still other embodiments, the user's spoken commands could be entirely processed and interpreted by a remote speech recognition engine. For instance, a recording of the user's spoken commands could be relayed to a remote speech recognition engine, and the speech recognition engine would then process the spoken commands and send data back the local device indicating what the user is commanding. Even this process could be accomplished in real time such that the user is unaware that the interpretation of his spoken commands is being accomplished on a remote device.

Because of the greater sophistication that is possible with a system embodying the invention, if the local device does not understand something, it can often ask another question of the user to clarify the situation. In addition, the local device can offer greatly expanded vocabulary and speech processing by enlisting the assistance of network agents. For all these reasons, a consumer electronic device that is coupled into the DVAES architecture can provide a much more sophisticated voice application than prior art devices which were not connected to a network.

Once the spoken command has been interpreted, in some instances, the local device 212 may be able to satisfy the user's request. In other instances, the local device 212 might need to request information from a VA Rendering Agent 240 to satisfy the user's request. If that is the case, the local device 212 would send a query over the data network 220 to the VA Rendering Agent 240 for some type of content. The requested content would be returned to the local device 212, and the local device 212 would then provide the content to the user via the user's telephone 202. In other instances, the local device may be able to query other network-connected elements which are not a part of the DVAES Architecture, and those other elements would return the requested data to the local device so that the data could be delivered to the user via the audio interface.

Depending on the VA being performed, the functions that are performed in response to a user request may not involve playing audio information to the user via the user's audio interface. For instance, the local device could be performing a VA relating to accessing e-mail. In this instance, a user's spoken request could cause the local device to act in a manner that ultimately results in the user's e-mail messages being shown on a display screen. In this instance, although the user makes use of a speech-based interface to obtain information and/or perform a certain function, the ultimate result is not the playback of audio, but rather display of an e-mail message.

The end result of a user request could take many other forms, such as the local device causing a certain action to be taken. For instance, the user might speak a request that causes the user's home air conditioning system to be turned on. The list of possible actions that could be enabled by the local device is virtually endless. But the point is that the local device is able to provide a speech-enabled interface to the user, via the audio interface, to allow the user to accomplish a task.

In another simple embodiment, the user might pick up his telephone 202 and speak a request to be connected to another person's telephone. A voice application performed on the local device would interpret the user's spoken request. This could be done on the local device, or the voice application could utilize remote assets to accomplish the speech recognition. Some or all of the speech recognition could occur on the remote assets. The voice application would then take steps to place a telephone call to the person identified by the user. This might involve connecting the user via the telephone network 230, or connecting the user to the requested party via a VoIP call placed over the data network 220.

It is also worth noting that when a user is connected to the DVAES architecture, the VAs provided by the system can completely replace the dial tone that people have come to associate with their telephones. The moment that a user picks up his telephone, he will be launched directly into a voice application that is provided by the system. In the past, this may have been technically possible, but it was always accomplished by making use of the traditional phone system. For instance, one of the prior art centralized voice services platforms would have been capable of ensuring that the moment a user lifts his telephone, that user was immediately connected to a central voice services platform that would guide the remainder of the user's experience. But this was always accomplished by establishing an immediate voice channel between the user's telephone and the central voice services platform. And to accomplish that, it was necessary to involve the telephone carrier that would link the user's telephone to the voice services platform. In contrast, with the DVAES architecture, one no longer needs to make any use of the telephone carriers to provide this sort of a service. And, as noted above, the user can still be easily connected to the regular telephone network if he needs to place a call.

In the same vein, in the past, whenever a user wanted to have a third party service answer his telephone calls, as in traditional voice mail systems, it was necessary to involve the carrier in routing such calls to a third party service. Now, when a call is made to the user's telephone, the DVAES architecture makes it possible to answer the call, and take voice mail recordings, without any further involvement of the carrier. Here again, the DVAES architecture makes it possible to eliminate the services of the telephone carrier.

In both the examples outlined above, the involvement of the carrier necessarily increased the cost of providing the voice services. Because the carrier can be eliminated, the same sorts of voice services can be provided to a user for a significantly reduced cost. And, as explained below, the services can be delivered with greater performance and with new and better features.

In some embodiments, rendered Voice Application processing is performed on the local device and the associated the voice recognition functions may also be performed on the local device. For this reason, there is no need to establish a dedicated duplex audio link with a remote high end computer. Also, even in those instances where a portion of the voice application processing is performed by a remote device, and/or where processing and interpretation of spoken commands is processed by a remote device, the communications necessary to accomplish these actions can be made via data packets that traverse a data network. Thus, here again, there is no need to establish a dedicated duplex audio link with a remote high end computer to provide the requested services.

Also, because the local embedded device is coupled to a data network such as the Internet, it can rapidly obtain Rendered Voice Applications and associated data from various remote sources in order to satisfy user requests. For these reasons, the simple embedded local device allows one to provide the user with speech recognition enabled Voice Applications without the need to create and maintain a high end speech service platform with multiple telephone line access equipment.

As noted above, the local device could also use the network to obtain access to various other physical elements to effect certain physical actions, such as with the home air conditioner example given above. In this context, the other physical elements could be connected to the network, or the local device could have a local connection to physical elements that are also located on the user's premises. For instance, the local device could have a hard-wired or wireless connection to many different elements in a user's home or office that allow the local device to control operations of the physical elements. In other embodiments, the piece of physical equipment could act as the local device itself.

One obvious advantage of a DVAESA over prior art voice service platforms is that a DVAESA embodying the invention can provide VAs to users without any involvement of a PSTN, VoIP, Peer-Peer carrier. The instant the user picks up his telephone handset, he will be interacting with the DVAESA, not the telephone system. A large number of VAs could be accomplished without ever involving a telephone carrier as the Voice Application is delivered and provided on the local device. Because the user can directly access the DVAESA without making a telephone call, the operator of the DVAESA will not need to pay a telephone carrier in order to provide the service to users.

As noted above, if the user wishes to place a telephone call, this can be easily accomplished. But there is no need to use a telephone carrier as an intermediary between the user and the DVAESA. This has multiple positive benefits.

Also, for a multitude of different reasons, a DVAESA will be less expensive to deploy and operate than the prior art central voice services platforms. To begin with, because the DVAESA can provide services to users without a telephone link, the DVEASA operator no longer need to purchase and maintain multiple telephone line ports into the system.

Also, the types of equipment used by the DVAESA are inherently less expensive to deploy and manage than the equipment used in a central voice services platform. A DVAESA embodying the invention uses relatively inexpensive network appliances that can be located anywhere, and that can be deliberately distributed over a wide area to enhance reliability of the system. In contrast, a central voice services platform requires expensive and specialized telecom equipment like telecom switches and IVR servers. The central voice services platforms also require more intensive management and provisioning than a DVAESA, and this management must be provided by highly skilled personnel as most of the equipment used is highly proprietary in nature. In contrast, the DVAESA is largely managed by an automated management system.

A prior art central voice services platform is only able to simultaneously service a limited number of users. As noted above, in the prior art central voice services platforms, a dedicated voice link, via a telephone call, is maintained for each connected user. Once all lines are connected to users, no additional users are able to access the system. Hence the maximum number of simultaneous users that can be supported at any given time is equal to the lesser of the number of access lines or the number of associated telephony/IVR ports an operator maintains.

In contrast, a DVAESA embodying the invention has a very high limit on the number of users that can be simultaneously serviced. In a DVAESA embodying the invention, the moment a customer picks up his telephone he will be connected to the system. Thus, a DVAESA embodying the invention is "always on." Also, much of the interactions between the user and the system are handled directly by the local device on the customer premises. If the local device cannot immediately service a user request, and additional information is needed, the local device may make a synchronous or asynchronous request over the Internet. Typically, the information will be quite rapidly returned and played to the user. Thus, even if there is a small delay, the user is nevertheless still connected the voice services system.

With the DVAESA model, the same number of server assets can handle data requests from a much larger number of users as compared to the prior art central voice services platform. This is also another reason why a DVAESA is less expensive to deploy and maintain than a prior art central voice services platform.

In addition to being easier and less expensive to deploy and maintain, a DVAESA embodying the invention can also scale up much more quickly and at a lower cost as new users are added to the system. To begin with, because the DVAESA does not require dedicated telephone lines to operate, there is no cost associated with adding additional telephone ports to the system to accommodate additional users. Likewise, as new users are added, there are no new additional telecommunications expenses for more connect time or access. In addition, for the reasons noted above, the equipment used by the system is far less expensive than the equipment used in a central voice services platform to service the same number of users. Thus, adding any new equipment and users is less expensive for a DVAESA. Moreover, because it requires less equipment to service the same number of users in a DVAESA, there is much less equipment to purchase and maintain for each additional 1000 users.

A DVAESA embodying the invention is inherently more reliable than a prior art central voice services platform. Because the assets of a prior art system are typically located in a few physical locations, and are tied to physical phone lines, power outages and other physical problems are more likely to prevent users from being able to use the system. In contrast, a DVAESA can have its equipment distributed over a much wider area to reduce these problems. The points of a failure of a DVAESA can be highly localized and it is very cost effective to replicate DVAESA equipment.

Moreover, the underlying nature of the DVAESA makes it easy to connect multiple redundant servers to the network, so than in the event one or more assets fail, redundant assets can step in to take over the functions of the failed equipment. This was difficult to do in prior art central voice services platforms, and even when it was possible to provide redundant capabilities, the cost of providing the redundant equipment was much higher than with a DVAESA.

In addition, a prior art central voice service platform needs a telephone carrier to provide access to the users. If the telephone carrier has a service outage, the prior art system cannot function. In contrast, a DVAESA does not have any reliance on a telephone carrier.

The only network required to provide the DVAESA is the data network like the Internet. The user in most cases will not experience an interruption to access to the voice services of a DVAESA, even if there is an outage that disables the local device's access to the Internet. The local device could potentially perform some of the applications without connecting to the network. This indicates that for some Voice Applications in the DVAESA, it may be sufficient for the local device to have intermittent access to the Internet The architecture of a DVAESA makes it inherently able to deliver certain types of VAs with vastly improved performance. To use one concrete example, as noted above, when a central voice services application is attempting to deliver the same audio message to large number of users, the central voice services application must place a telephone call to each user, using a dedicated phone line, and deliver the message. Because the central voice services platform only has a limited number of outgoing lines, it can take a significant amount of time to place all those calls.

In contrast, in a DVAESA embodying the invention, it is not necessary to place any telephone calls to deliver the audio message to users. Instead, a server which is part of the system can push instructions to play the audio message, and the message itself (the message could be stored in advance of when the event to deliver the message occurs), to each of the local devices, and the local devices can then play the messages for each individual user. In variations on this theme, the server might only send the instruction to play the message, along with a reference to where a copy of the audio message is stored. Each local device could then download a copy of the message from the indicated location and play it for the user. Regardless, it would be possible for the DVAESA architecture to deliver the audio message to all the users in a small fraction of the time that it would take the prior art central voice services platform to accomplish the job.

Moreover, as also explained above, while the prior art central voice services platform is making calls to deliver audio messages to a plurality of users, it is tying up it's phone lines, and thus it's capacity to allow users to call in for services. In contrast, when a DVAESA is delivering audio messages to a plurality of users, the users are still able to access their voice services for other purposes.

A DVAESA embodying the invention also makes it possible to deliver many new voice applications and services that could never have been provided by the prior art central voice services platform. In most cases, it is the underlying differences in the architecture of a DVAESA embodying the invention, as compared to the prior art voice services platforms, which make these new services possible.

For example, a user could configure a voice application to run constantly in the background on a local device, and then take a certain action upon the occurrence of a specified event. So, for instance, the user could set up a voice application to break into an existing telephone conversation to notify him if a particular stock's trading price crosses a threshold. In this scenario, the voice application would periodically check the stock price. If the threshold is crossed, the voice application could cause any existing telephone call that the user is on to be temporarily suspended, and the voice application would then play the notification. The voice application could then return the caller to his call. This sort of a voice application would also be very complicated to provide under the prior art central voice services platform.

The graceful integration of advertising messages is another example of how a DVAESA embodying the invention can provide services that were impossible to provide with prior art central voice service platforms. As an example, if the user lifted the telephone and spoke a command that asked for options about ordering a pizza, the system could respond with a prompt that said, "to be connected to Pizza Shop A, say one; to be connected to Pizza Shop B, say two. By the way, Pizza Shop A is having a two for one special today." Thus, the advertising message could be gracefully incorporated into the played response. Also, the advertising message would be highly context relevant, which would make it more interesting to advertisers. Thus, advertising revenue could be collected by the operator of the DVAESA system.

A DVAESA embodying the invention could also be used to rapidly collect data from a very large number of users in ways that would have been impossible with prior art central voice services platforms. In this example, assume that a television program is currently airing, and during the program, viewers are invited to vote on a particular issue. In prior art systems, the users would typically place a telephone call to a central voice services platform and make a voice vote. However, as noted earlier, prior art voice services platforms are only able to talk to a limited number of callers at the same time because the callers must be connected by dedicated phone lines.

In a DVAESA embodying the invention, the user might be able to pick up the phone and say, "I want to vote on issue X." The system would already know that viewers of a television program had been invited to place a vote, so the system could immediately take the user's voice vote. The system could also tabulate the votes from all users making similar voice votes, and then provide the voting results to the television show producers in real time. Because so little actual information is being exchanged, and the exchanges are made over the Internet, thousands, and perhaps even millions of votes could be received and tabulated in a very short period of time. This would have been impossible with prior art central voice services platforms. Furthermore, a DVAES can distribute a fully featured voice application that not only plays the message, but further solicits feedback from the user, optionally tailors the interaction with the user, and may record any user feedback or responses. Furthermore, if the producers of the television show were willing to pay a fee to the operator of the DVAESA, the system could be configured such that as soon as viewers are invited to cast a vote, and for the duration of the voting period, anytime that a user of the DVAESA picks up his telephone to access the system, the system would first respond with the question, "would you like to vote on issue X?" This would be yet another way to derive advertising or promotional revenue from the DVAESA.

There are countless other ways to exploit the architecture of a DVAESA embodying the invention to accomplish tasks and to perform VAs that would have been impossible using the prior art central voice services platforms. The above examples are merely illustrative.

A DVAESA embodying the invention also allows for much greater personalization of the voice applications themselves than was possible with prior art central voice services platforms. In addition, the architecture allows the users themselves to control many aspects of this personalization.

To begin with, as explained above, in a DVAESA a VA Rendering Agent is responsible for customizing voice applications, and then delivering the customized voice applications to the local devices at the customer sites. Thus, the basic architecture assumes that each user will receive and run personalized versions of voice applications. This difference alone makes it much, much easier to provide users with personalized voice applications than prior art central voice services platforms.

The VA Rendering Agent could personalize a voice application to take into account many different things. For instance, the VA Rendering Agent could access a database of user personal information to ensure that a VA takes into account things like the user's name, his sex, age, home city, language and a variety of other personal information. The VA Rendering Agent could also access information about the capabilities of the local device at the customer's location that will be providing the VA, and possibly also the type of audio interface that the user has connected to the local device. The VA Rendering Agent could then ensure that the customized version of the VA that is provided to the user's local device is able to seamlessly and efficiently run on the local hardware and software. The VA Rendering Agent could also take into account user preferences that the user himself has specified. For instance, the VA could be customized to play audio prompts with a certain type of voice specified by the user.

Another important way that VAs could be personalized is by having the DVAESA track how the user is interacting with the system. For Example if the user has a certain type of accent or has a certain pattern of use or has a certain type of background noise, the VA Rendering Agent could take these factors into account on an on going basis to ensure that the customized VAs that are sent to the user are tuned to the user. The system might also note that whenever a three choice menu is played to the user, the user always makes the third selection. In that case, the VA Rendering Agent might be directed to re-render the VA so that the VA presents the third option first, instead of last.

There are any number of other ways that VA's could be customized or personalized to take into account aspects of individual users. And these customizations are easily and automatically accomplished by configuring the VA Rendering Agents to automatically incorporate these personalizations when delivering VAs for users. Because the DVAESA is configured so that each individual user may have his own versions of VAs, preferably stored on his local devices cache, this personalization is not difficult to accomplish. Such personalizations are complimented by the continuous analytics process that is being performed on DVAESA data. This data is collected during the on going functioning of the system and is provided by all DVAESA components. After collection, the data is analyzed, and the results of the analysis are used to continuously tune and improve the functioning of the system on an individual user-by-user basis.

A DVAESA also allows for better, more direct billing for delivery or usage of services. Because there is no telephone company acting as an intermediary, the operator of a DVAESA can directly bill users for use of the system. Also, the way the system is configured, the user can select individual services, which are then provided to him by rendering a VA and loading it on the user's local equipment. Thus, the user can tailor his services to his liking, and the operator of the DVAESA has an easy time tracking what services the user has. For all these reasons, it is much easier to bill the user for use of the services.

Another benefit that flows from the DVAESA model is the ability of a user to access services provided from two different DVAESA operators on a single piece of local equipment. As will be explained in more detail below, a first DVAESA operator could load a first set of VAs onto the user's local equipment, and a second DVAESA operator could load a second set of VAs onto the same piece of operator equipment. For instance, the first DVAESA operator could be one that provides the user with services related to his business, and the second DVAESA operator could be one that provides the user with services relating to the user's personal life. There is no inherent conflict in both having two different sets of VAs loaded onto the local device. And each DVAESA operator can thereafter maintain and update their respective VAs. Likewise, the user can cause both sets of VAs to be loaded on a first device at his office, and a second device at his home. This allows the user to easily and immediately access services from either operator, regardless of his present location. This sort of flexibility would also have been completely impossible in prior art central voice services platforms.

A DVAESA can also provide enhanced security measures compared to prior art central voice services platforms. For instance, because the DVAESA is interacting with the user via spoken commands, it would be possible to verify the identity of a user via a voiceprint comparison.

In addition, the individual local devices can be identified with unique ID numbers, and credentials verifying the identity and permissions of users and devices can all be created and stored in various locations on the system. By using these unique identification numbers and certification files, one can ensure that only authorized users can access sensitive information or perform sensitive functions.

Figure 3:
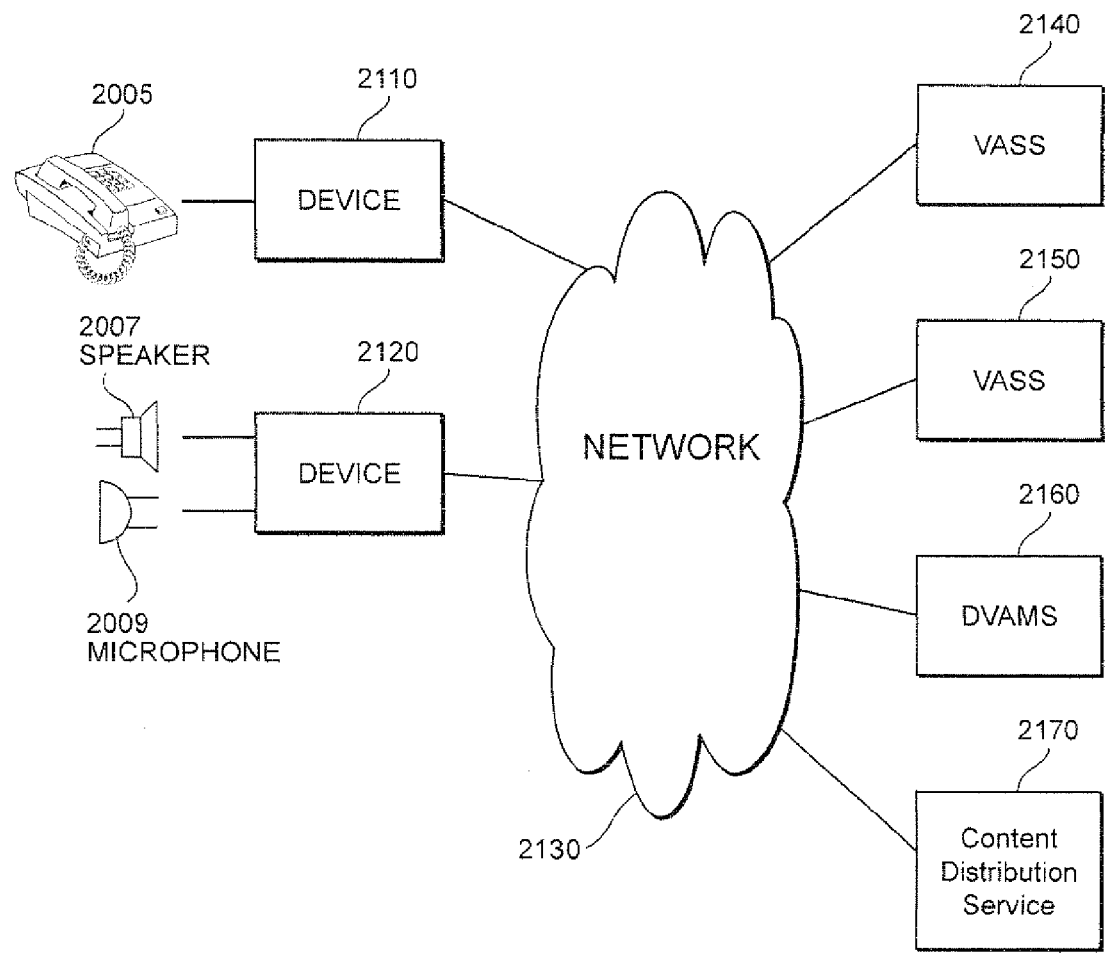
FIG. 3 is a diagram of another system embodying the invention that can be used to deliver voice-based services to a user.

Having now provided a broad overview of the how a system embodying the invention would operate, and the inherent advantages of a DVAESA system as compared to prior art systems, we will now turn to a slightly more specific description of the main elements of a DVAESA embodying the invention, with reference to FIG. 3. In doing so, we will introduce some new definitions and terminology which will be used throughout the remainder of the detailed description.

A DVAESA would be configured to deploy and utilize one or more Voice Application Agents (hereinafter "VAAs") which themselves enable the delivery or performance of a VA through a local device that would typically be located in a user's home or office. In some instances, a VAA may be wholly resident on a single local device. In other instances, the functions of a VAA may be split between multiple portions of the overall system. Likewise, a single local device may only host one VAA. Alternatively, a single local device may host multiple VAAs. These variations, and the flexibility they provide, will be discussed in more detail below. The important concept is that a VAA is the agent that is responsible for delivering or performing a VA for the user.

The network 2130 shown in FIG. 3 could be the Internet. However, in some instances, the network 2130 could be a public or private local network, a WAN, or a Local Area Network. In most instances, however, the network 2130 will be the Internet. Also, the network 2130 could also comprise portions of the PSTN, existing cellular telephone networks, cable television networks, satellite networks, or any other system that allows data to be communicated between connected assets.

Figure 4:
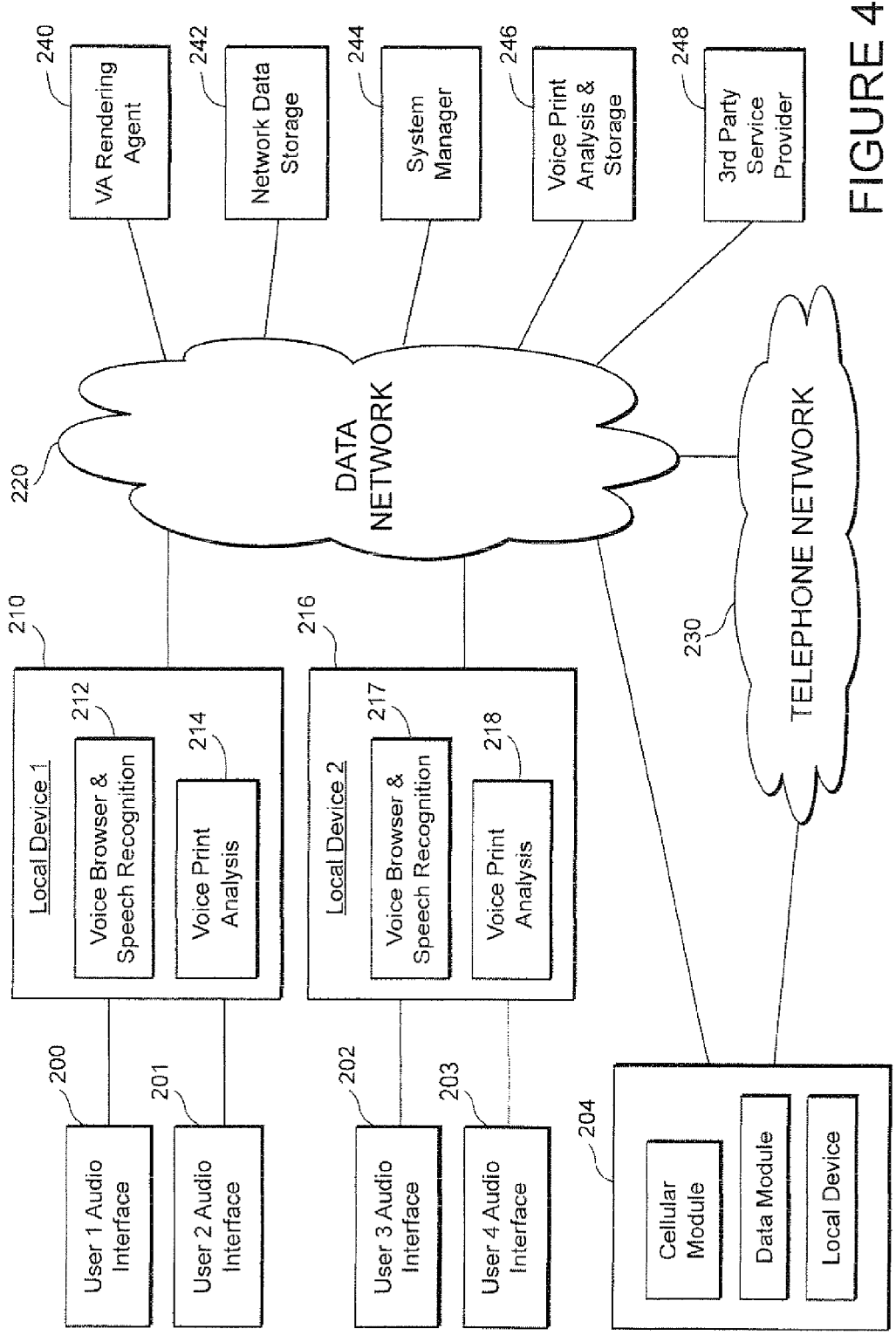
FIG. 4 is a diagram of another system embodying the invention that can be used to deliver voice-based services to a user.

The devices 2110 and 2120 appearing in FIG. 3 would be the local embedded devices that are typically located at a user's home or office. As shown in FIG. 4, in some instances, a local device 2110 could simply be connected to the user's existing telephone. In other instances, the local device could be coupled to a speaker 2007 and microphone 2009 so that the local device can play audio to the user, and receive spoken commands from the user. In still other embodiments, the local device may be a standalone telephone, or be included as part of a cellular telephone, a computing device with wireless access, a PDA that incorporates a cellular telephone, or some other type of mobile device that has access to a data network.

A system embodying the invention also includes components that deliver voice applications, data and other forms of content to the local devices. These components could include one or more Voice Application Services Systems (hereinafter VASSs). In the system depicted in FIG. 3, there are two VASSs 2140 and 2150. A system embodying the invention could have only a single VASS, or could have multiple VASSs.

One of the primary functions of a VASS is to render VAs and to then provide VA components to VAAs. In preferred embodiments, a VASS would provide customized VAs components to VAAs, upon demand, so that the VAAs can perform the customized VAs components for the user. The VASSs could personalize generic VAs based on known individual user characteristics, characteristics of the environment in which the VA components will be performed, information about how a user has previously interacted with the system, and a wide variety factors. The distribution of the personalized VA components to the VAAs could also be accomplished in multiple different ways.

A system embodying the invention may also include one or more Content Distribution Services (hereinafter a "CDSs"). This is an optional component that basically serves as a data storage and content distribution facility. If a system embodying the invention includes one or more CDSs, the CDSs would typically provide network-based caching of content, such as VA components, configurations, DVAESA components, and other shared or frequently used content. The CDSs would be deployed throughout the network to help reduce network traffic latency, which becomes particularly noticeable in any speech interaction system.

The DVAESA components could broadly be identified as a Distributed Voice Application Execution System (hereinafter, a "DVAES"), and a Distributed Voice Application Management System (hereinafter, a "DVAMS") A DVAES comprises at least a VASS, one or more VAAs, and the underlying hardware and software platforms.

The system shown in FIG. 3 includes a DVAMS. The DVAMS handles a wide variety of management functions which include registering users, specific items of hardware and other DVAES components, directing the rendering, caching, distribution and updating of VAs components, organizing and optimizing the performance of system assets, and multiple other functions. The DVAMS may also include an interface that allows an individual user to customize how the system will interact with him, and what products and services the user wishes to use. The DVAMS would also provide an interface that allows system operators to manually control various aspects of the system.

Because the systems and methods embodying the invention are intended to provide users with highly personalized services, and because the voice applications themselves are often highly specialized to serve each individual's needs, problems can arise when multiple users access the system with a single local device. For instance, a local device in a home might be used by multiple different members of a family. While it is easy to create highly personalized voice applications for each family member, the difficulty arises in identifying which family member is accessing the system at any given moment.

To help identify the users, the system can conduct a voiceprint analysis when a user first begins to interact with the system. The system would compare the verbal/spoken commands issued by a user to audio recordings of these same words and commands as spoken by each of the users who typically interact with the local device. Provided there is a match, the system would then perform the personalized voice applications for that identified user for the requested actions. As a result, regardless of who makes a request or issues a command, the system would still respond with highly personalized services without the need for the user to first undergo an identification process.

Another aspect relates to privacy. Voice applications can provide a user with information that could be considered confidential or private. Likewise, a voice application might be configured to take a particular action that should only be authorized by a certain user. For instance, a voice application might allow a user to check a bank account balance, or transfer money. Obviously, only the owner of the bank account should be authorized to take these actions.

It would be possible for a voice application to request that a user provide a password or an identification number before taking actions that involve confidential information. However, because a system embodying the invention is intended to interact with a user via spoken commands, this can be problematic. If a user speaks a password or identification code aloud, there is a possibility that an unauthorized person will overhear the password or authorization code, and thereafter be able to access the user's confidential information.

For all the above reasons, identifying a user through a voiceprint analysis is preferable to having a user speak a password or identification code aloud. If the system is able to verify the identity of a user to a very high degree of confidence, then there is no need to take any further action before providing the user with access to confidential information or services of a confidential nature.

Voiceprint identification, like speech recognition, is often expressed as a confidence factor. The confidence factor is intended to represent the confidence that a particular spoken word or phrase matches a pre-recorded word or phrase. In the context of this system, a voice application performed on a local device might be trying to verify the identity of a user to a certain degree of confidence. If that degree of confidence is obtained by the voiceprint analysis, then the system would assume that a certain user is accessing the system, and the system would proceed to interact with the user based on that identity.

In some embodiments, the system might make an initial identification of the user to a low or medium degree of confidence. As the session proceeds, and as the user speaks additional and different words, the system would be able to compare more of the user's spoken words to prerecorded words previously spoken by the user, and the system might be able to confirm the identity of the user to a higher degree of confidence.

Once the system has identified a user to a low or medium degree of confidence, the system could begin to interact with the user utilizing voice applications that have been personalized for that user. However, if the user requests that the system take an action that is of a personal, sensitive or confidential nature, the system might refuse to proceed with the requested action until the user has been identified to a greater degree of confidence. Performing some actions for a user might require only a low or medium degree of confidence regarding the user's identity, whereas performing other actions for the user might require a higher degree of confidence regarding the user's identity.

For instance, the system might perform the dialing of a telephone number for a user, using a particular user's telephone list, based on an identification of the user that only rises to a medium level of confidence. If the system misidentifies the user, and uses the wrong address book, the consequences are not that bad.

However, if the user is requesting access to voice or email, the system might refuse to provide access until the system can verify the identity of the user to a higher degree of confidence. Identifying the user to a higher degree of confidence might involve asking the user to speak a predetermined sequence of words or a phrase so that a voiceprint identification can be performed to a greater degree of confidence. To help prevent an unauthorized person from obtaining information, the system might randomly select the words to be spoken by the user, which should prevent someone from using a recording of a predetermined phrase taken from a user. The identification process might also require the user to provide a password or access code known only to the user.

A more detailed depiction of the elements of a system required to accomplish voiceprint identification is illustrated in FIG. 4. As shown therein, the local device 210 for a particular location includes both voice browser and speech recognition elements 212, and a voiceprint analysis section 214.

When a user first begins to interact with the system using one of the audio interfaces 200, 201, the voiceprint analysis section 214 of the local device 210 would immediately conduct a voiceprint analysis to attempt to identify the user. If a voiceprint match is confirmed, the system would then interact with the user based on the identity of the user.

If the system is unable to identify the user with a minimum level of certainty, the local device 210 might be able to enlist the assistance of a voiceprint analysis and storage device 246 via the data network 220. This remote device might be able to confirm the identity of the user to a greater degree of certainty. Also, in some embodiments, the local device might not include any voiceprint analysis elements, and the voiceprint identification might always be conducted by the remote analysis device 246.

In systems embodying the invention the assets and software which are used to conduct a voiceprint analysis could all be resident on the local device that is being used to interact with the user. In other instances, the assets and software could all be located on remote devices that are accessible to a voice application performed on a local device via the data network 220. In still other instances, the analysis could be performed by combinations of local and remote assets and local and remote software. A system that utilizes any combination of assets and software used to conduct a voiceprint analysis would fall within the scope of the invention.

In conducting a voiceprint analysis, the system assets and software would typically be comparing a user's spoken input to previously stored recordings of the user speaking the same words. The previously stored recordings could be stored locally on those local devices which a user most frequently uses to access the system. However, the previously stored recordings could instead, or in addition, be stored on remote data storage devices. Any combinations of locally and remotely stored recordings could be used to conduct a voiceprint analysis.

During an initial registration of a new user, the system might ask a user to speak certain key words and phrases, and the system could record the user's speaking those words. There initial recordings could be used to conduct voiceprint analyses to identify the user in the future. However, as the user continues to interact with the system over time, the system might store more and more words and phrases spoken by the user which will then be used in conducting future voiceprint analyses. Thus, over time the system could build up a larger and larger knowledgebase above individual users to enhance the system's ability to quickly and confidently identify the user through a voiceprint analysis.

Because the system would typically attempt to identify a user based on the first few words spoken by the user, the system might be able to conduct the voiceprint identification using only a relatively small number of words. For instance, the system could record a relatively small number of words for each of the users, those words corresponding to the first few words that are spoken by users when they are performing the most common commands or requests for information. Those recordings could then be stored on the local devices most commonly accessed by the users in a relatively small amount of memory. However, as noted above, in some embodiments, all user recordings that are used to conduct voiceprint analyses might be stored on remote devices.

In an alternate embodiment, each user might have an identification phrase which has been stored in memory, and which can be used to establish the user's identity. In this instance, the user might be asked to speak the identification phrase, and the user's spoken input would be compared to the pre-recorded identification phrase to confirm the identity of the user. The identification phrase could be the same for all users, or each user could have a different identification phrase. In still other embodiments, each user might have a password that is unique to the user. And the local device 210 might require the user to speak his password to help verify the user's identity.

There may also be situations where the system is initiating an interaction with the user. In this instance, the system might know the first few words that are likely to be spoken by the user during the initial contact. For instance, a voice application might be contacting a user to deliver a recorded message to the user. In this instance, the voice application might ring the user's telephone, or otherwise begin to interact with the user using the audio interface connected to the user's local device. If the system were to ring the user's telephone, the user would likely pick the phone up assuming it is a normal telephone call and answer with the words "Hello." Because of the audio device that was used to contact the user, the system would know that only a very few people are likely to answer. If the telephone is located in the user's home, only those people who live in the home are likely to answer. As a result, the system can compare the initial "Hello" spoken by the person answering the phone to recordings of the same word taken from the few people who reside at the home to try to quickly and easily determine which user answered the phone.

If there is a match to the intended user, with a high degree of confidence, the system could proceed to deliver the message. Because the voiceprint analysis will be conducted against only a very few potential matching people, the voiceprint analysis can be conducted relatively quickly and easily.

If there is no match, or if the match only rises to a low level of confidence, the system could then query the person who answered with a question like "Is this John Smith?" Alternatively, the system could simply ask the user to identify himself. The system would then use the words spoken by the person in reply to the question to try to make a voiceprint match to a higher degree of confidence. Here again, there would be only a confined set of words that a person is likely to use in responding to the query. And conducting the voiceprint analysis in this fashion can make the voiceprint match an easy and fast one to perform.

If a voice application needs to verify the identity of a user, and the voice application asks the user to speak his name, then the speech recognition capabilities of the system could be used to interpret the user's spoken response to determine the spoken name. Once this has occurred, the voiceprint analysis unit would be able to access the previously recorded words for that identified individual, and works spoken by the party who identified himself could be compared to those previously made recordings. Proceeding in this fashion allows the voiceprint analysis unit to compare new spoken input from an unknown user to a limited number of previously made recordings of the same words, which makes the voiceprint analysis faster and easier to conduct than in situations where an unknown user's input must be compared to previously made recordings from a large number of different potential users.

In some instances, a user will want to access the system at a new location, through a local device that he has never previously used. When this occurs, any voiceprint analysis assets resident on the local device at the new location are not likely to have recordings of words from by the user. Normally, this would make it impossible to identify the user via a voiceprint analysis. It is possible for a local device of a system embodying the invention to rapidly identify a user through a voiceprint analysis, even when the user has never accessed the system through that local device in the past, because the voiceprint analysis can be conducted with the assistance other system assets.

With reference to FIG. 4, assume that User 3 normally accesses the system through local device two 216. Because of this fact, local device two 216 has stored recordings of User 3 speaking certain key words and phrases. And each time that User 3 begins to interact with local device two 216, the voiceprint analysis unit 218 on the local device 216 compares the user's spoken input to the previously made recordings from that user to verify the identity of User 3. Of course, as noted above, the voiceprint analysis could be accomplished using remote assets. But even in this instance, because User 3 typically accesses the system through local device two 216, even the remote assets would first compare the spoken input to previously made recordings from User 3 based on the assumption that he may be the party initiating contact.

If User 3 instead tries to access the system through local device one 210, local device one 210 will not have previously stored any recordings of User 3's voice. If the voiceprint analysis is being conducted remotely, the remote assets might not even try to compare the new spoken input to previously made recordings from User 3 because User 3 does not typically access the system through local device one 210. As a result, the system may not be able to immediately verify the identity of User 3 through voiceprint analysis.

However, local device one 210 could ask User 3 to speak his name or an identification code. Local device one 210 would then interpret this spoken input using speech recognition techniques. As noted above, the speech recognition could occur entirely on local device one 210, or entirely on a remote device, or on combinations of the two. Regardless, the system would interpret the user's spoken input to determine the name spoken by the user. Based on this information, the voiceprint analysis unit conducting the analysis would be able to obtain previously made recordings from that user which can be used to conduct a voiceprint analysis. Those previously made recordings could come from local device two 216, or from some other remote storage device. Regardless, because of the distributed nature of the system, it is possible to identify a user at a local device, even when the user has never before attempted to access the system through that local device.

In a similar situation, assume that User 5 has a portable computing device which includes a cellular telephone 204. The portable computing device 204 is capable of accessing the data network 220 or the telephone network 230. Typically, User 5 would access the telephone network 230 via a cellular telephone link.

The portable computing device 204 would also include all of the features of a local device of the system described above. As a result, User 5 would utilize the local device resident on the portable computing device 204 to access voice applications. Communications between the portable computing device 204 and other elements of the overall voice application system could pass through a data link with the data network 220 or a data link traversing the telephone network 230.

Now, assume that User 2 would like to utilize User 5's portable computing device 204 to access one of his customized voice applications.

As illustrated in FIG. 4, User 2 would normally access the system through the first local device 210. If User 2 instead attempts to access the system through User 5's portable computing device 204, there are two difficulties. First, the local device on the portable computing device 204 must first verify the identity of User 2. Second, once the identity of User 2 has been confirmed, the local device on User 5's portable computing device 204 must then obtain and perform voice applications which have been customized for User 2.

As explained above, the identity of User 2 could be established by obtaining previously taken recordings of User 2 speaking certain key words or phrases from another local device or from a separate network storage device. This information could be obtained through a data link on the data network 220, or through a data link passing through the telephone network 230. Once the previously made recordings from User 2 have been obtained, a voiceprint analysis can be conducted to confirm the identity of User 2.

Once User 2's identity has been verified, the local device on User 5's portable computing device 204 needs to obtain customized voice applications for User 2. The customized voice applications could be obtained from a voice application rendering agent 240, from a different network storage device 242, or from local device one 210, which is typically accessed by User 2. The local device 204 would obtain User 2's customized voice applications and would then perform the voice applications for User 2.

When a local device obtains voice recordings for a new user, those voice recordings may be stored on the local device for a certain period of time. If the same user again attempts to access the system through that local device, the voice recordings will already be available to conduct a voiceprint analysis and identification of the user. On the other hand, if the same user does not again attempt to access the system through that local device for a predetermined period of time, the voice recordings for the user may be purged from memory.

If a user accesses the system through a local device, and the user is requesting an uncommon action, one which uses words that are not stored in the voiceprint analysis section of the local device, the local device might enlist the aid of the remote voiceprint analysis and storage device to identify the user 246. The remote device 246 might be capable of storing a much larger number of comparison words for each user, and the remote device might be able to rapidly compare the words that were just spoken by the user to a much larger number of pre-recorded words. Using the remote voiceprint analysis device 246 might result in a small delay. But the delay would only occur when the user makes an uncommon request. Thus, the overall user experience would not be significantly degraded.

If the voiceprint analysis section of the local device 210 and/or the remote device 246 is unable to identify the user based on the words spoken at the beginning of a session with the system, it might be possible for the system to interact with the user and to take certain actions, provided those actions do not require that the system know the identity of the user. If this is possible, the system might abandon an immediate attempt to identify the user, and the system could proceed with the interaction. During those interactions, the user is likely to speak additional and different words than were spoken during the initial interactions with the system. Thus, as the session proceeds, the system may be able to obtain sufficient information to identify the user.

If, on the other hand, if the system needs to know the identity of a user to take the requested action, the system might request that the user identify himself. This could be done by asking the user to speak one or more predetermined words or phrases that exist in the recordings stored in the voiceprint analysis section. Although this would force the user to undergo an identification process, it might be necessary to take this action in order to obtain the requested services from the system.

If a user is interacting with the system to perform a first voice application, and the user then switches to a different second voice application, then any identification of the user that was conducted by the first voice application could be carried over to the second voice application. Thus, is the second voice application would normally begin by attempting to identify the user, that step could be skipped because the user's identity has already been established. Of course, this requires that voice application be able to communicate with one another to pass along the identification of a user that has occurred.

In addition, if multiple third party businesses create their own customized voice applications that users can interact with to perform various functions, each of the businesses can rely upon the system's inherent ability to conduct voiceprint analyses. This eliminates the need for each business to develop their own facilities to conduct voiceprint analyses. Instead, the voice applications created for each business could call on certain pre-packaged modules to conduct an identification of a user.

When a user is interacting with a voice application for a significant period of time, the system may wish to re-conduct a voiceprint analysis on a periodic basis to confirm that the person who is continuing to interact with the voice application is the same user that began to interact with the voice application. Periodic verifications of the identity of the user could prevent situations where one user begins to interact with a voice application, and then another unknown party steps in and tries to access the original user's confidential or personal information.

Figure 5:
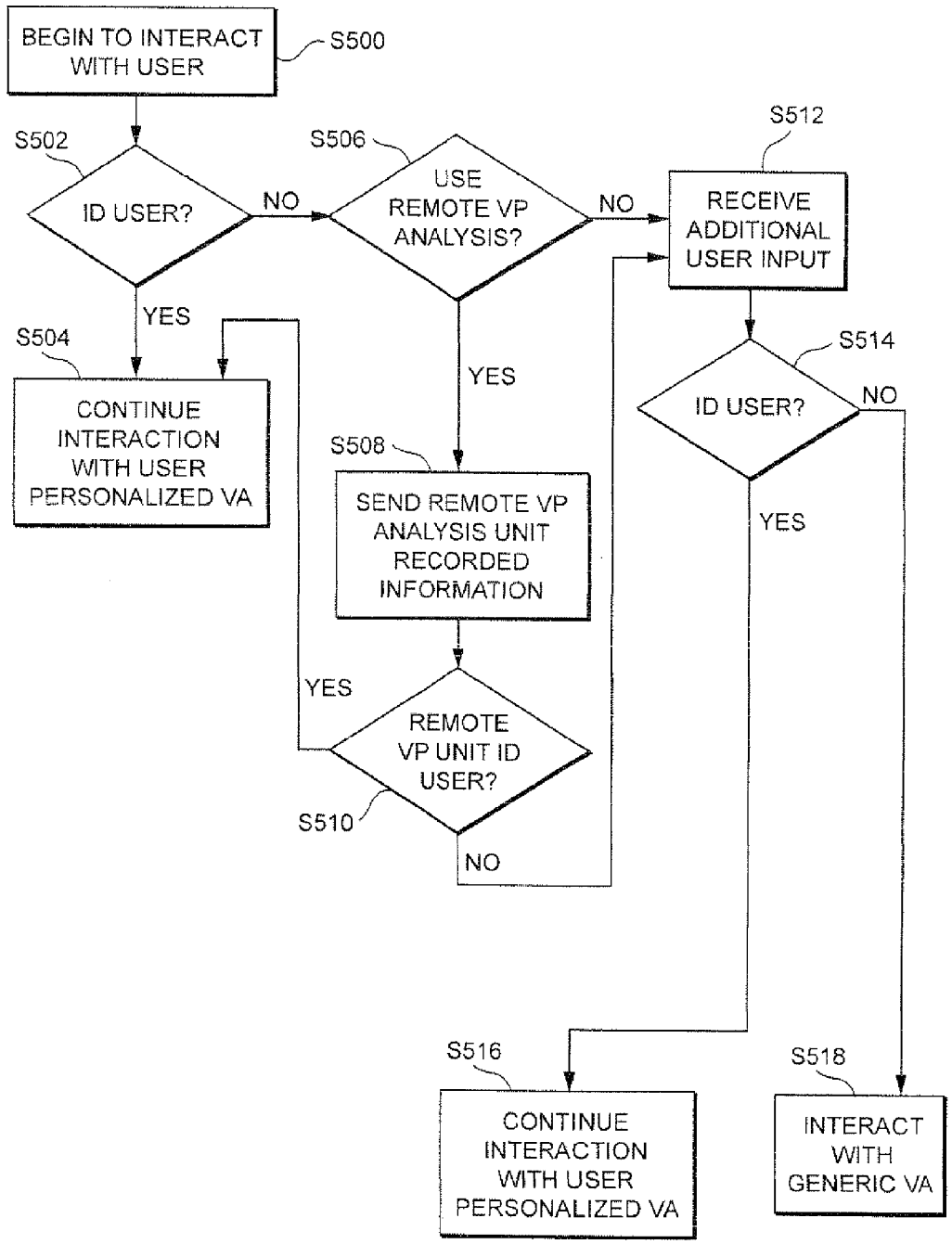
FIG. 5 illustrates steps of a method of identifying a user via a voiceprint analysis.

FIG. 5 illustrates steps of a method embodying the invention. During this method, a local device attempts to verify the identity of a user in order to interact with the user using the user's personalized voice applications. If the local device is unable to identify the user, the local device utilizes generic voice applications.

The method starts in step S500 where the local device would receive some spoken input from the user. In step S502, a voiceprint analysis is conducted on the local device to compare one or more words or phrases spoken by the user to prerecorded words and phrases obtained from various users who typically interact with the local device. If the voiceprint analysis is able to confirm the identity of the user who provided the spoken input, the method proceeds to step S504, where the local device will begin to interact with the user using that user's personalized voice applications.

If a voiceprint analysis on the local device cannot identify the user, the method proceeds to step S506 where the local device enlists the aid of a remote voiceprint analysis unit. Typically, this would involve the local device sending the remote voiceprint analysis unit copies of recordings of the user's spoken input, as well as the names or identifications of various parties that the local device believes may be attempting to access the local device. The remote voiceprint analysis unit would then attempt to identify the user through a voiceprint analysis.

In step S510, if the remote voiceprint analysis unit is able to identify the user, the method will proceed to step S504, and the local device will begin to interact with the user using the user's personalized voice applications. If the remote voiceprint analysis unit is unable to identify the user, the method would proceed to step S512.

In step S512 the local device would request additional input from the user who is attempting to access the system. This could be a request to speak predetermined words or phrases, or a request for the user to speak his name or an identification number. In step S514, an attempt would be made to identify the user with this additional spoken input. Step S514 could include both the local device attempting to identify the user with the additional spoken input, as well as the remote voiceprint analysis unit attempting to identify the user based on the additional spoken input. If the user is able to be identified with the additional spoken input, the method would proceed to step S516 and additional interactions with the user would take place utilizing the user's customized voice applications. If the system is unable to identify the user with the additional spoken input, the method would proceed to step S518, and the system would continue to interact with the user via only generic voice applications. This could result in the user being unable to access certain personal or confidential information available on the system.

Figure 6:
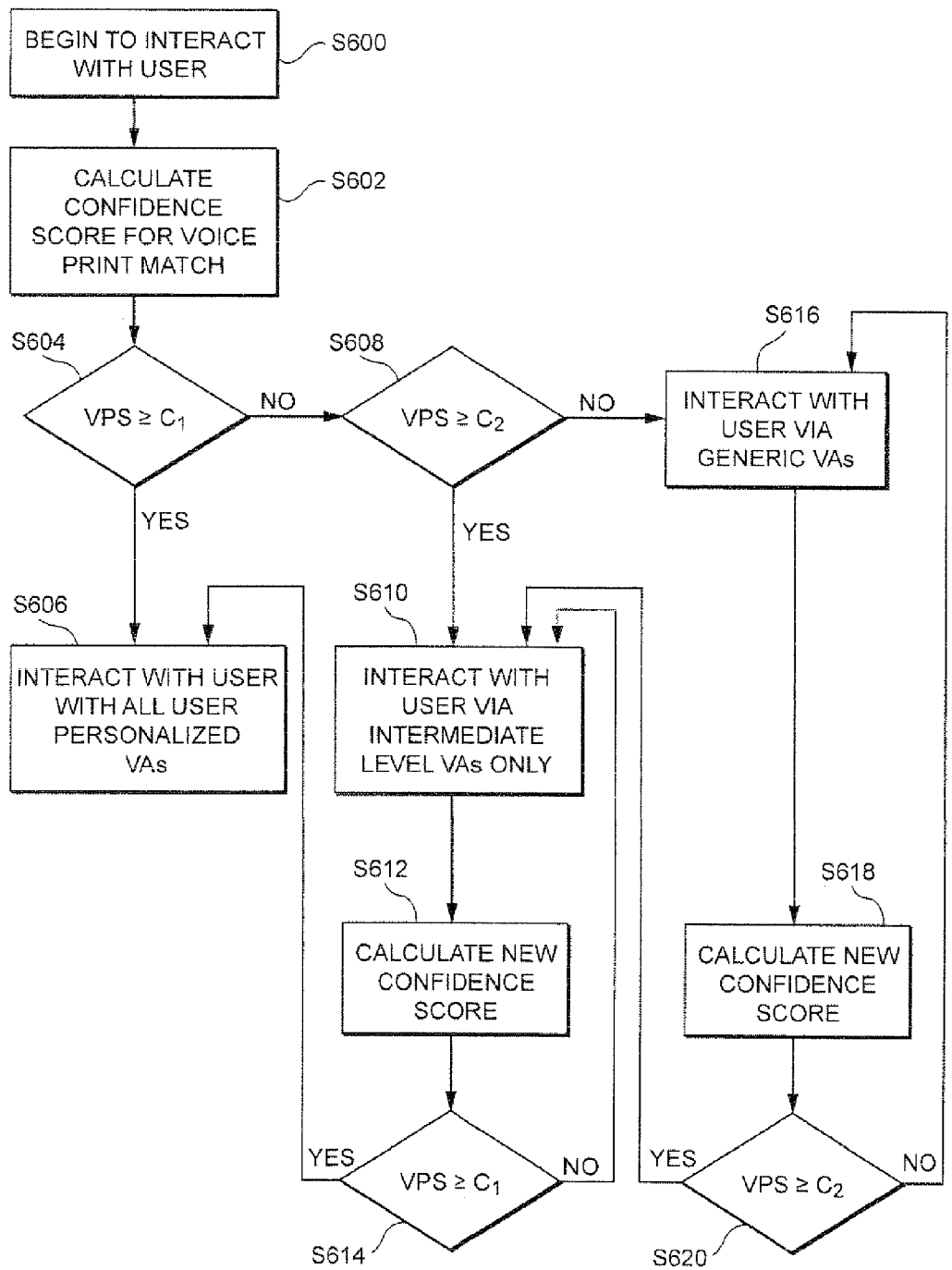
FIG. 6 illustrates steps of another method of identifying a user via a voiceprint analysis.

FIG. 6 illustrates steps of another method embodying the invention. In this method, the system pays careful attention to the confidence scores generated by voiceprint analysis. As mentioned above, the result of a voiceprint analysis is typically a confidence score which reflects how confident the system is that the spoken input provided by a person matches spoken input provided by that same person at a previous time. A high confidence score would indicate a very good match between the new spoken input and the old spoken input. Conversely, a low confidence score would indicate that there is not a good match between the new spoken input and the previously provided spoken input.

The method illustrated in FIG. 6 begins with step S600 where the system would begin to interact with an unknown user. A local device would receive some spoken input from the user. In step S602, a voiceprint analysis would be conducted to attempt to identify the user based on the spoken input. As explained above, the voice print analysis could be conducted using system assets and previously taken recordings that are located anywhere in the system. Ultimately, the result of the voiceprint analysis would be a first voiceprint confidence score "VPS1."

In step S604, the first voiceprint score VPS1 would be compared to a first confidence level $C_1$. If the voiceprint score VPS1 is greater than or equal to the first confidence level $C_1$, the system would determine that the unknown user has been identified to a relatively high degree of certainty. As a result, in step S606, the system would continue to interact with the user utilizing all of the identified user's customized voice applications.

If the voiceprint score VPS1 of the initial voiceprint analysis is not equal to or greater than the first confidence level $C_1$, this would reflect some level of uncertainty about the identity of the unknown user. As a result, in step S608 the first voiceprint score VPS1 would then be compared to a second, lower level confidence factor $C_2$. If the voiceprint score VPS1 is greater than or equal to the second confidence level $C_2$, this would indicate that the identity of the unknown user has been confirmed to a medium level of confidence. If this is the case, the method would proceed to step S610, and the system would interact with the user based upon intermediate level voice applications only. For instance, the user might be able to access an address book, but the user would not be able to access confidential information such as email or voice mail. However, further interactions with the user would then occur.

In step S612, the additional spoken input provided by the user would be used to calculate a second voiceprint score VPS2. In step S614, the new voiceprint score VPS2 would then be compared to the first confidence level $C_1$. If the new voiceprint score, which is obtained using additional spoken input, is greater than or equal to the first confidence level $C_1$, then the system determines that the identity of the user has been confirmed to the higher level of certainty, and further interactions with the user will take place with all of the user's customized voice applications. In other words, the method would proceed to step S606.

If the new confidence score VPS2 computed in step S612 is not greater than or equal to the first confidence level $C_1$, the method would loop back to step S610 where the system would continue to interact with the user utilizing only intermediate level voice applications. As additional spoken input is obtained from the user, the system would continue to conduct voiceprint analyses utilizing the additional spoken input in an attempt to identify the user with a greater degree of certainty. If the user's identity is able to be confirmed with a greater degree of certainty, the system could always then proceed on to step S606 where the system interacts with the user using all of the user's customized voice applications.

In step S608, if the original voiceprint score VPS1 is not greater than or equal to the second (lower) confidence level $C_2$, the method would proceed to step S616. In step S616, the system would interact with a user via generic voice applications. The user would not be provided with access to any customized voice applications or any confidential information. However, interactions with the user via the generic voice applications would likely result in the system receiving additional spoken input from the user. Accordingly, in step S618, the system would then calculate a new voiceprint score VPS3 utilizing the additional spoken input. This new voiceprint score would then be compared to the second confidence factor $C_2$ and if the voiceprint score is greater than or equal to $C_2$, the method would proceed on to step S610 so that the system could begin to interact with the user utilizing intermediate level voice applications. On the other hand, if the new voiceprint score VPS3 calculated with the additional input does not exceed or equal the second confidence level $C_2$, the method would loop back to step S616 so that the system continues to interact with the user utilizing generic voice applications.

The method illustrated in FIG. 6 allows the system to immediately begin to interact with the user regardless of whether or not the user has been identified with a high degree of certainty. And the additional interactions with the user are utilized to refine the voiceprint analysis, and to attempt to identify the user to a greater degree of certainty. If the additional spoken input provided by the user allows the system to identify the user with a higher degree of certainty, the system will immediately begin to interact with the user on that basis.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although the invention has been described with reference to a number of illustrative embodiments thereof, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method of interacting with a user of a distributed voice application execution system, comprising:

receiving spoken input from an individual using a local device, wherein the spoken input is received by one of a voice application and a voice applications agent that is resident, at least in part, on the local device;

conducting a voiceprint analysis on the received spoken input in an attempt to identify the individual, wherein the result of the analysis is the identification of a first user's identity, and a first confidence value that indicates the likelihood that the individual who provided the spoken input is the first user;

performing a first voice application for the individual that is configured to perform a function for the individual other than identifying the individual when the first confidence value is below a first threshold value, which indicates that the voiceprint analysis was unable to identify the individual to a high degree of confidence, wherein the first voice application is performed by a voice applications agent that is resident, at least in part, on the local device, and wherein performing the first voice application comprises receiving additional spoken input from the individual; and conducting a second voiceprint analysis using the additional spoken input when the first voice application is performed in an attempt to verify that the individual is the first user, wherein the result of the second analysis includes a second confidence value that indicates the likelihood that the individual who provided the additional spoken input is the first user.

2. The method of claim 1, wherein the first voice application that is performed by the voice applications agent is a generic voice application.

3. The method of claim 1, wherein if the second confidence value is above the first threshold value, which indicates that the second voiceprint analysis was able identify the individual to a high degree of confidence, the method further comprises performing a second voice application for the individual, wherein the second voice application is one which has been customized for the first user.

4. The method of claim 3, wherein if the second confidence value is above a second threshold value which is higher than the first threshold value, performing a second voice application for the individual comprises performing a voice application that utilizes the first user's confidential information.

5. The method of claim 3, wherein if the second confidence value is above a second threshold value which is higher than the first threshold value, performing a second voice application for the individual comprises performing a voice application that provides the individual with functionality customized for the first user.

6. The method of claim 1, further comprising performing a second voice application for the individual that is configured to perform a function for the individual other than identifying the individual when the first confidence value is above the first threshold value, wherein the second voice application is a voice application that has been customized for the first user.

7. The method of claim 6, wherein performing the second voice application comprises receiving supplementary spoken input from the individual, and wherein the method further comprises conducting a second voiceprint analysis using the supplementary spoken input in an attempt to verify that the individual is the first user, and wherein the result of the second voiceprint analysis includes a second confidence value that indicates the likelihood that the individual who provided the supplementary spoken input is the first user.

8. The method of claim 7, wherein if the second confidence value is above a second threshold value which is higher than the first threshold value, the method further comprises performing a third voice application for the individual, wherein the third voice application is one which utilizes the first user's confidential information.

9. The method of claim 7, wherein if the second confidence value is above a second threshold value which is higher than the first threshold value, the method further comprises performing a third voice application for the individual, wherein the third voice application provides the individual with functionality reserved for the first user.

10. The method of claim 1, wherein if the first confidence value is above the first threshold value, the method further comprises performing a second voice application for the individual which has been customized for the first user, and which utilizes the first user's confidential information.

11. The method of claim 1, wherein if the first confidence value is above the first threshold value, the method further comprises performing a second voice application for the individual which has been customized for the first user and which provides the individual with functionality reserved for the first user.

12. A non-transitory computer readable medium having instructions stored thereon, which when executed by one or more processors of a local device and/or one or more processors of at least one computer server in communication with the local device, cause the local device and/or the at least one computer server to perform a method of interacting with a user of a distributed voice application execution system, the method comprising:
receiving spoken input from an individual using a local device, wherein the spoken input is received by one of a voice application and a voice applications agent that is resident, at least in part, on the local device;
conducting a voiceprint analysis on the received spoken input in an attempt to identify the individual, wherein the result of the analysis is the identification of a first user's identity, and a first confidence value that indicates the likelihood that the individual who provided the spoken input is the first user;
performing a first voice application for the individual that is configured to perform a function for the individual other than identifying the individual when the first confidence value is below a first threshold value, which indicates that the voiceprint analysis was unable to identify the individual to a high degree of confidence, wherein the first voice application is performed by a voice applications agent that is resident, at least in part, on the local device, and wherein performing the first voice application comprises receiving additional spoken input from the individual; and
conducting a second voiceprint analysis using the additional spoken input when the first voice application is performed in an attempt to verify that the individual is the first user, wherein the result of the second analysis includes a second confidence value that indicates the likelihood that the individual who provided the additional spoken input is the first user.

13. The non-transitory computer readable medium of claim 12, wherein the first voice application that is performed by the voice applications agent is a generic voice application.

14. The non-transitory computer readable medium of claim 12, wherein if the second confidence value is above the first threshold value, which indicates that the second voiceprint analysis was able to identify the individual to a high degree of confidence, the method further comprises performing a second voice application for the individual, wherein the second voice application is one which has been customized for the first user.

15. The non-transitory computer readable medium of claim 14, wherein if the second confidence value is above a second threshold value which is higher than the first threshold value, performing a second voice application for the individual comprises performing a voice application that utilizes the first user's confidential information.

16. The non-transitory computer readable medium of claim 14, wherein if the second confidence value is above a second threshold value which is higher than the first threshold value, performing a second voice application for the individual comprises performing a voice application that provides the individual with functionality customized for the first user.

17. The non-transitory computer readable medium of claim 12, wherein the method further comprises performing a second voice application for the individual that is configured to perform a function for the individual other than identifying the individual when the first confidence value is above the first threshold value, wherein the second voice application that is performed is a voice application that has been customized for the first user.

18. The non-transitory computer readable medium of claim 12, wherein the method further comprises performing a second voice application for the individual that is configured to perform a function for the individual other than identifying the individual when the first confidence value is above the first threshold value, wherein the second voice application that is performed is one which has been customized for the first user, and which utilizes the first user's confidential information.

19. The non-transitory computer readable medium of claim 12, wherein the method further comprises performing a second voice application for the individual that is configured to perform a function for the individual other than identifying the individual when the first confidence value is above the first threshold value, the second voice application that is performed is one which has been customized for the first user and which provides the individual with functionality reserved for the first user.

20. The method of claim 3, wherein the second voice application is configured to perform the same function as the first voice application.

21. The system of claim 14, wherein the second voice application is configured to perform the same function as the first voice application.

* * * * *